United States Patent [19]

Severin

[11] Patent Number: 4,471,312
[45] Date of Patent: Sep. 11, 1984

[54] INTEGRATED CIRCUIT DEMODULATOR FOR FSK SIGNALS

[75] Inventor: William A. Severin, Houston, Tex.

[73] Assignee: Texas Instruments Incorporated, Dallas, Tex.

[21] Appl. No.: 269,213

[22] Filed: Jun. 2, 1981

[51] Int. Cl.³ .................................... H04L 27/14
[52] U.S. Cl. ............................. 329/103; 329/110; 329/126; 375/88; 375/96
[58] Field of Search ............ 329/101, 102, 103, 104, 329/105, 110, 112, 126, 204, 205 R, 206; 375/88, 90, 91, 94, 96; 455/214, 337

[56] References Cited

U.S. PATENT DOCUMENTS 3,683,278 8/1972 Ohnsorge et al. ............ 329/104 X
3,947,769 3/1976 Rousos et al. ................ 375/91

OTHER PUBLICATIONS

Hosticka, B. J. et al., "MOS Sampled Data Recursive Filters Using Switched Capacitor Integrators", IEEE Journal of Solid State Circuits, vol. SC-12, No. 6, pp. 600–608, Dec. 1977 (not classified).
Martin, K. et al., "Strays-Insensitive Switched Capacitor Filters Based On Bilinear Z-Transform", Electronics Letters, vol. 15, No. 13, pp. 365–366, Jun. 21, 1979 (not classified).
Golyuka et al., *Synchronous Detector with an Operational Amplifier*, Instruments and Experimental Techniques, vol. 18, #2, pt. 2, pp. 500–501, Mar.-Apr. 1975 (pub. Sep. 1975) (329-126).

Primary Examiner—Siegfried H. Grimm
Assistant Examiner—W. R. Paxman
Attorney, Agent, or Firm—Thomas G. Devine; Leo N. Heiting; Melvin Sharp

[57] ABSTRACT

An integrated circuit demodulator receives an alternating signal at a first frequency and an alternating signal at a second frequency and provides a binary output corresponding to the first and second frequencies. An input signal is received by a first and a second frequency filter. If the input signal is the first frequency, then it is attenuated in the second frequency filter and vice versa. A positive full wave rectifier receives the first frequency signal and provides a positive full wave rectification thereof. A negative full wave rectifier receives the second frequency signal and provides a negative full wave rectification thereof. The rectifications are summed in an operational amplifier, thereby providing a difference so that the positive rectification is reduced by the attenuated negative rectification and the negative rectification is reduced by the attenuated positive rectification. A binary output is thereby provided.

5 Claims, 7 Drawing Figures

INTEGRATED CIRCUIT DEMODULATOR FOR FSK SIGNALS

BACKGROUND OF THE INVENTION

1. Field of the Invention

This invention relates to a demodulator for detecting binary signals from analog signal inputs, and more specifically to an integrated circuit demodulator in an FSK modem for demodulating input FSK mark and space signals.

2. Description of the Prior Art

In the past, such demodulation has been achieved through various demodulating circuits including discrete component circuits. Also, demodulation has been achieved through the use of bipolar transistors. Often, half wave rectification has been utilized.

This invention utilizes field effect transistors, specifically metal oxide semiconductor field effect transistors (MOSFETs) and a pair of full wave rectification circuits where one incoming signal is positively rectified and the other is negatively rectified. One incoming signal is attenuated in the presence of the other. The signals are summed, providing a difference which is representative of a binary value.

BRIEF SUMMARY OF THE INVENTION

An integrated circuit demodulator has one input for receiving a mark frequency signal and another input for receiving a space frequency signal. The signals are received from a mark and space filter, respectively, wherein the mark frequency is attenuated in the space filter and the space frequency is attenuated in the mark filter. A comparator receives the mark frequency and provides an output when the reference voltage is crossed in a positive direction. The mark output signal is stored in a first capacitor. Likwise, the comparator receives the space frequency and provides an output when the reference is crossed in a negative direction. The space output signal is stored in a second capacitor. The mark frequency signal is also stored in a third capacitor and the space frequency signal is stored in a fourth capacitor. The first capacitor is connected to logic circuitry that inverts and transfers the contents of the third capacitor to an operational amplifier if there is a mark output signal stored. If not, the contents of the third capacitor are simply transferred, without being inverted. In like manner, logic circuitry is provided for transferring and inverting the contents of the fourth capacitor when the space output signal is stored in the second capacitor and for simply transferring, without inverting, the contents of the fourth capacitor when the space output signal is not stored.

The principal object of this invention is to provide a demodulator for detecting binary information contained in a pair of input alternating signals.

Another object of this invention is to provide a demodulator to receive a mark and space signal, with each signal attenuated in the presence of the other, for detecting binary information therefrom.

Another object of the invention is to provide a demodulator having a positive full wave rectifier for providing positive full wave rectification of the mark signal and a negative full wave rectifier for providing negative full wave rectification of the space signal and having circuitry for summing the output of the two rectifiers to provide a binary output.

Still another object of this invention is to provide a full wave rectifier for an integrated circuit demodulator.

These and other objects will be made evident in the detailed description that follows.

DETAILED DESCRIPTION

Figure 1:
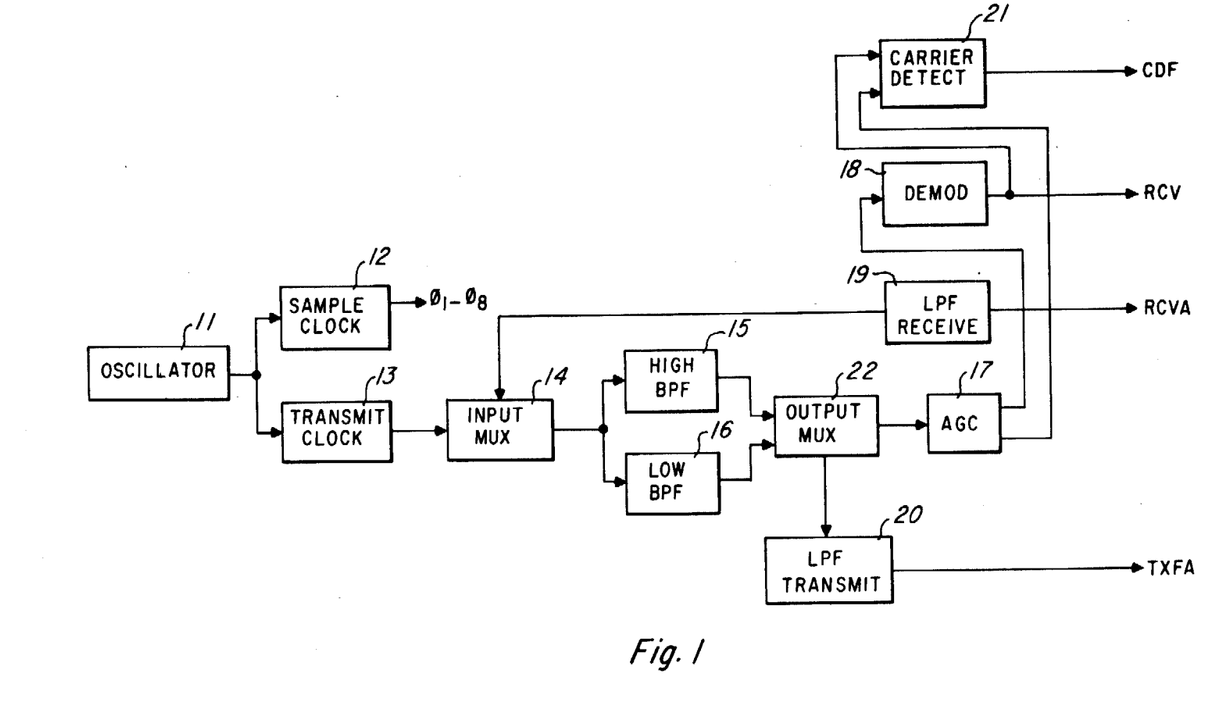
FIG. 1 is a block diagram of the FSK modem which employs the integrated circuit demodulator of this invention.

FIG. 1 illustrates the FSK modem that employs the integrated circuit demodulator of this invention in block form. Oscillator 11, whose frequency is controlled by an off-chip crystal, provides a 4.032 MHz signal to sample clock 12 and transmit clock 13. Sample clock 12 provides eight timing signals, phase 1 through phase 8. Clock phases 3 and 4 are used in the demodulator as will be discussed herein.

The input FSK signal identified as "RCVA" is input to low pass filter receive 19, whose output provides an input to the input multiplexer 14. Thus the receive signal is filtered through LPF receive 19 and then passes through the high band pass filter 15 or low band pass filter 16, depending upon the particular frequency band. For example, in this preferred embodiment, a first band frequency includes a space frequency of 1270 HZ and a mark frequency of 1070 HZ, and a second band frequency containing a space frequency of 2225 HZ and a mark frequency of 2025 HZ. Any pair of frequencies is, of course, attainable. The received signal, after having been appropriately filtered passes through the output multiplexer 22 into automatic gain control 17. AGC 17 adjusts the input sine wave to a prescribed level and provides an input to demodulator 18. Also, a control signal is provided to carrier detect 21. Demodulator 18 detects the frequency of the particular signal and converts it to digital data, either a space "0" or and a mark "1" providing output signal "RCV". Demodulator 18 provides an input to carrier detect 21 which detects the absence or presence of a carrier signal as indicated by signal "CDF".

Figure 2:
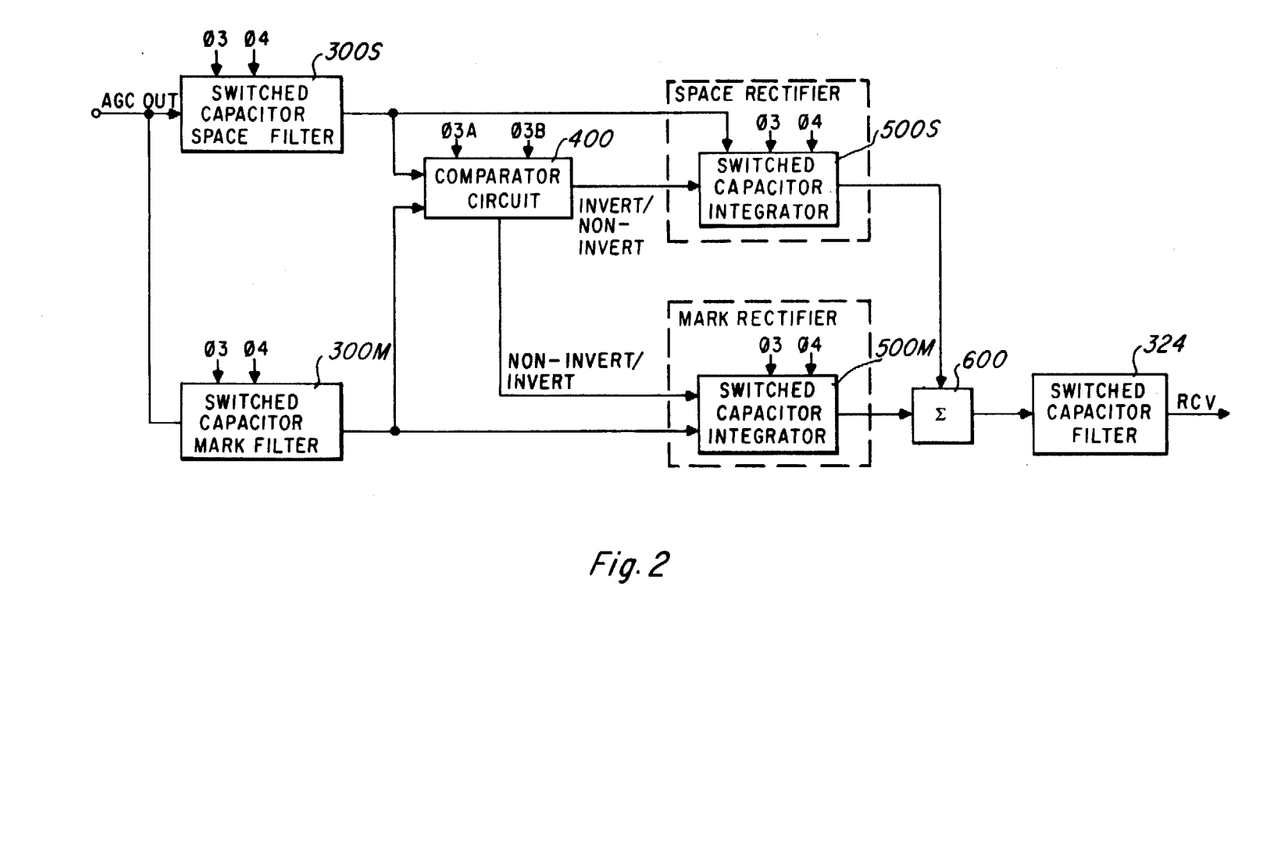
FIG. 2 is a block diagram of the integrated circuit demodulator.
Figure 5:
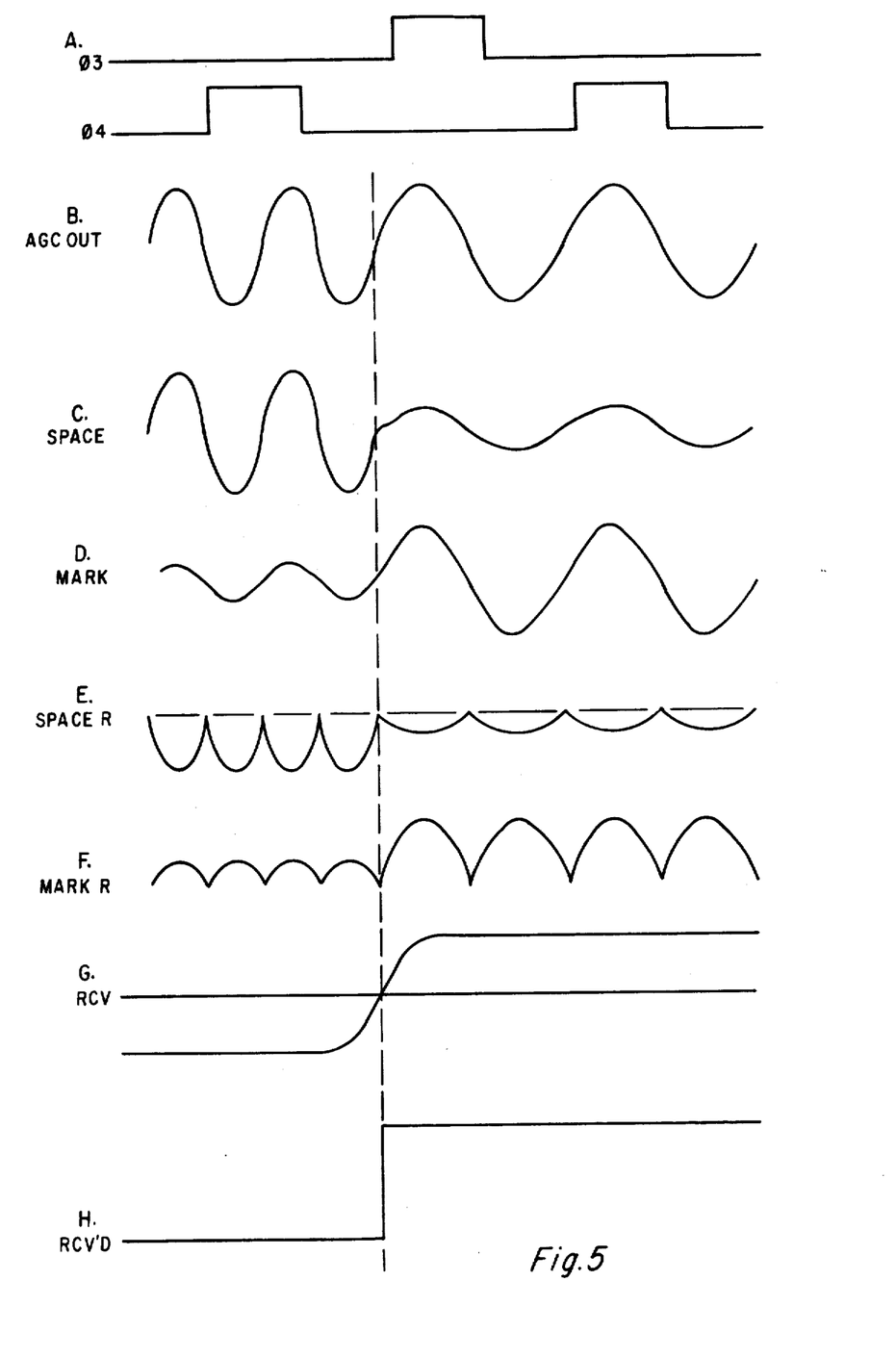
FIG. 5 illustrates wave shapes associated with the demodulator.

FIG. 2 illustrates the demodulator of this invention in block form. Signal AGCOUT from AGC17 is input to each of space filter 300S and mark filter 300M. Clock signal phases 3 and 4 are applied to these filters. Clock phases 3 and 4 are shown at A in FIG. 5. As indicated, they have a 25% duty cycle at a frequency of 25.846 KHz, in this preferred embodiment. The clock waveforms, as indicated in FIG. 5, are 180 degrees out of phase.

The outputs from each of space filter 300S and mark filter 300M are input to comparator circuit 400 and to integrator 500S and integrator 500M, respectively. An invert non-invert output from comparator 400 provides an input to integrator 500S. A non-invert/invert output from comparator 400 provides an input to integrator 500M. The outputs from these two integrators are summed in analog summing circuit 600 whose output is filtered through filter 324, providing output signal RCV. The detailed circuitry of this block diagram, and the operation of its components follows.

Figure 3A:
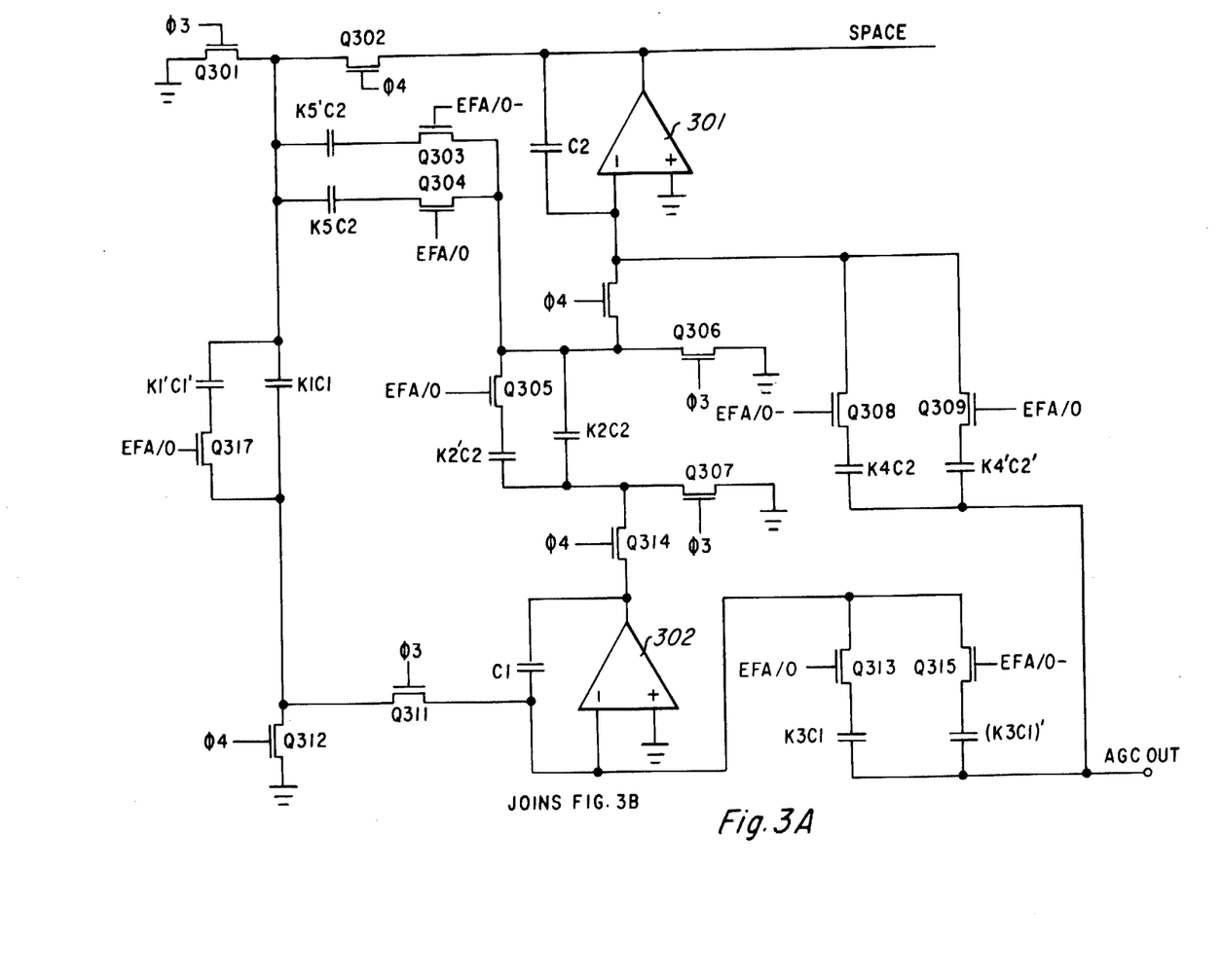
FIG. 3A is a schematic diagram of the mark and space filters.
Figure 3B:
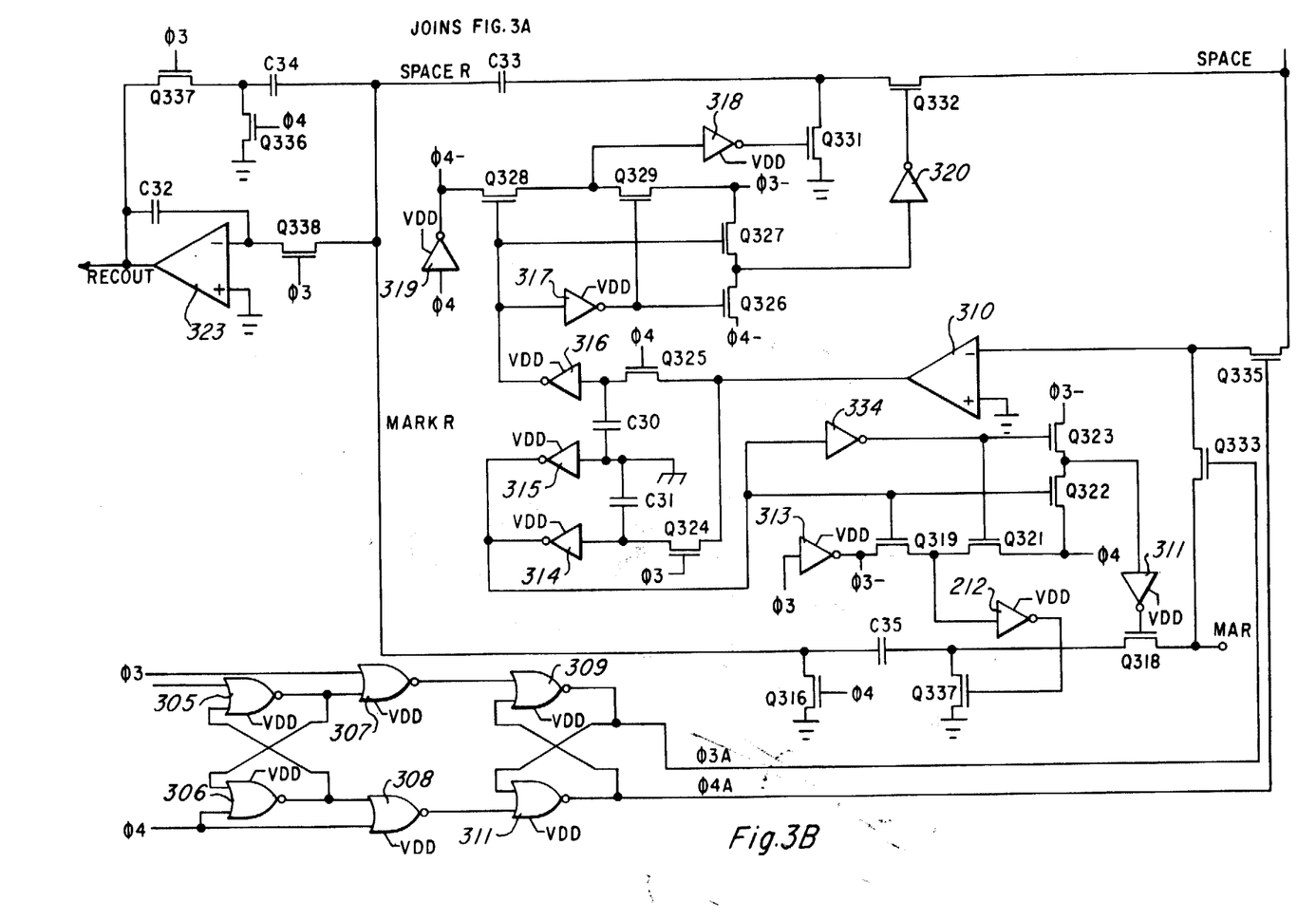
FIGS. 3B and 3C form a schematic diagram of the full wave rectifiers, smoothing and shaping circuitry, and carrier detect circuitry.
Figure 3C:
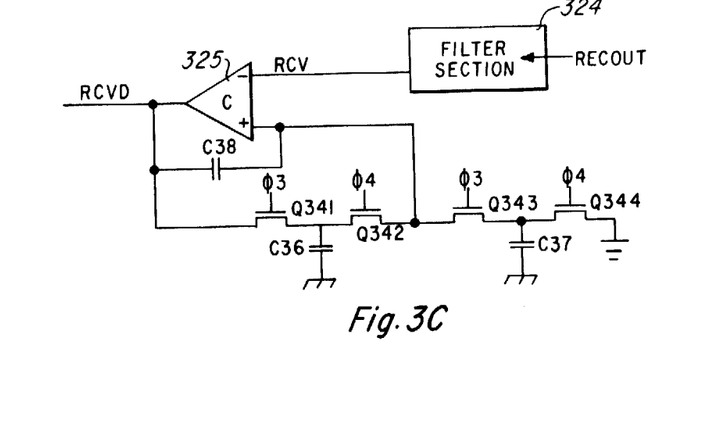

FIGS. 3A, 3B and 3C, connected as indicated, schematically describe the demodulator 18. FIG. 3A specifically details the mark and space filters. For purposes of description, the space filter will be described, but it is understood that the mark filter is identical except for the values of capacitance.

The space filter of FIG. 3A actually comprises two filters. The configuration, in this preferred embodiment, permits response to the mark or space frequency of either of the first or second frequency band. If the modem is operating as an answering modem, then the frequency band received will be the first band. If the modem is operating as the originating modem, then the second frequency band will be received. The mode of operation is controlled by the signal EFA/O and its negation. The input signal, AGC OUT, from the AGC circuit 17, is input via capacitors K3C1 and (K3C1)' through transistors Q313 and Q315, respectively to the inverting input of operational amplifier 302 whose non-inverting input is grounded. Transistor Q313 is gated by signal EFA/O and transistor Q315 is gated by signal EFA/O-. Therefore, either band of received signal may be received by this space filter.

Signal AGC OUT is also applied through capacitors K4C2, and K4'C2' to transistors Q308 and Q309, respectively, whose control electrodes have signals EFA/O- and EFA/O applied, respectively. The other main electrodes of transistors Q308 and Q309 are tied together to the inverting input of operational amplifier 301 whose non-inverting input is grounded.

Phase 4 is applied to the control electrode of transistor Q312 and phase 3 is applied to the control electrode of transistor Q301. One main electrode of each of transistors Q301 and Q312 is grounded while the other main electrodes are connected together through capacitor K1C1. The series combination of capacitor K1'C1' and transistor Q317 is connected in parallel with capacitor K1C1. Signal EFA/O is applied to the control electrode of transistor Q317. The ungrounded main electrode of transistors Q301 and Q312 are connected to one main electrode of each of transistors Q302 and Q311, respectively. Phase 4 is applied to the control electrode of transistor Q302 and phase 3 is applied to the control electrode of transistor Q311. The series combination of transistor Q304 and capacitor K5C2 is connected in parallel with the series connection of transistor Q303 and capacitor K5'C2. One end of that parallel combination is connected to the ungrounded main electrode of transistor Q301. Signal EFA/O- and signal EFA/O are applied to the control electrodes of transistors Q303 and Q304, respectively. The other end of the parallel combination is connected to the main electrodes of transistors Q305 and Q306, and to one side of capacitor K2C2. The other main electrode of transistor Q306 is grounded and phase 3 is applied to its control electrode. Signal EFA/O is applied to the control electrode of transistor Q305 whose other main electrode is connected to one side of capacitor K'2C2. The other side of that capacitor is connected to the other side of capacitor K2C2 and to one main electrode of each of transistors Q307 and Q314. The other main terminal of transistor Q307 is grounded and phase 3 is applied to its control electrode.

The other main electrode of transistor Q314 is connected to the output of operational amplifier 302, and phase signal 4 is applied to its control electrode. It should be noted that the equivalent parallel paths are connected in, depending upon the mode of operation of the modem. For example, transistor Q309 is gated by signal EFA/O to provide a path for capacitor K4'C2'. Transistor Q308 is gated by signal EFA/O- to provide a path for capacitor K4C2. Signal EFA/O gates transistor Q317 to provide a path for capacitor K1'C1'. Signal EFA/O gates transistor Q304 to provide a path for capacitor K5C2. Signal EFA/O- gates transistor Q303, providing a path for capacitor K5'C2. The output from the space filter is applied through transistor Q335, gated by phase 4A, to one input of comparator 310 whose other input is grounded (FIG. 3B).

The output from the mark filter is applied through transistor Q333, which is gated by phase 3A, to the non-inverting input of comparator 310 of FIG. 3B. The output from comparator 310 is applied through transistor Q325, gated by phase 4 to charge capacitor C30. The output from comparator 310 is also gated through transistor Q324 by phase 3 to charge capacitor C31. Capacitors C30 and C31 are charged to a certain amplitude indicating whether the received signal is a mark or space and whether it should be inverted. Capacitors C30 and C31 are tied to ground (analog). The charge on capacitor C30 is inverted through inverter 316 and provides gating for transistors Q328 and Q327. The output of inverter 316 is inverted through inverter 317 whose output provides gating for transistors Q329 and Q326. The charge on capacitor C31 is inverted by inverter 314 and is applied to the gates of transistors Q319 and Q322. The output from inverter 314 is further inverted through inverter 334 and applied to the gates of transistors Q321 and Q323. When transistor Q323 is gated, phase 3 is applied to the gate of transistor Q318. Transistor Q321 is gated at the same time, placing phase 4 on the gate of transistor Q337. When the output of inverter 314 is high, then transistor Q319 is gated and phase 3 is applied to the gate of transistor Q337. At the same time, transistor Q322 is gated, applying phase 4 to the gate of transistor Q318. Therefore, depending upon the state of capacitor C31, phase 3 and phase 4 are "swapped" between transistors Q337 and Q318.

The mark input is applied through transistor Q318, gated by either phase 3 or phase 4, grounded through transistor Q337 by either phase 4 or phase 3, and transmitted to charge capacitor C35. Capacitor C35 is tied to one main electrode of transistor Q316 and through transistor Q338, gated by phase 3, to the inverting input of operational amplifier 323, whose non-inverting input is grounded. Feedback capacitor C32 is connected from the output of operational amplifier 323 back to its inverting input. Phase 3 is inverted through inverter 313 and applied through transistor Q319 as stated above. Phase 4 is applied via transistor Q321.

When phase 4 gates transistor Q337, then the combination of that transistor, capacitor C35, transistor Q316 and transistor Q338 forms an inverting integrater. If phase 3 is applied to transistor Q317, then a noninverting integrater is formed.

The space input is applied through transistors, Q332 and Q331 to ground and to one terminal of capacitor C33. Capacitor C33 has its other terminal connected through transistor Q338 to the inverting input of operational amplifier 323. Capacitor C30 is connected to inverter 316 whose output gates transistors Q328 and Q327. The output of inverter 316 is also connected to the input of inverter 317 whose output gates transistors Q329 and Q326. Phase 4 is inverted through inverted 319 and applied through transistor Q328 to inverter 318 so that phase 4 is applied to the gate of transistor Q331 when the output of inverter 316 is high. Phase 3- is applied through transistor Q327, gated when inverter 316 is high, and inverted through inverter 320 to be applied to the gate of transistor Q332. Thus phase 4 is applied to the gate of transistor Q331 and phase 3 is applied to the gate of transistor Q332 when inverter 316 is high. When inverter 317 is high, then phase 4- is applied through transistor Q326 and is inverted by inverter 320 to apply phase 4 to the gate of transistor Q332. At the same time, phase 3- is applied through transistor Q329 and inverted through transistor 318 to the gate of transistor 331. The result of this circuitry is to provide positive rectification for the mark input and negative rectification for the space input. The two signals are summed in operational amplifier 323 and since one is positive and one is negative, it amounts to the difference being provided at the output of operational amplifier 323. If the mark signal is larger in amplitude than the space signal, a high signal will come out of operational amplifier 323. On the other hand, if the space signal is larger than the mark signal, a low signal will come out.

The output of operational amplifier 323 is connected through transistor Q337, gated by phase 3, to ground through transistor Q336, gated by phase 4, and through capacitor C34 to the other terminal of capacitor C33. The output of operational amplifier 323 also provides an input to filter section 324 (FIG. 3C). Filter section 324 provides output signal RCV, a smoothed waveform. The output from comparator 325 is fed back via capacitor C38 to its positive input and also through transistor Q341, gated by phase 3, and through transistor Q342, gated by phase 4, back to its positive input. Capacitor C36 is connected between transistors Q341 and Q342 to ground (analog). The positive input of comparator 325 is also connected through transistor Q343, gated by phase 3, and through transistor Q344, gated by phase 4, to ground. Capacitor C37 is connected between transistors Q343 and Q344 to ground (analog). Capacitors C36 and C37 provide hysteresis to reduce switching error. Comparator 325, by comparing to an analog reference, squares off the RCV signal to actual received data which is inverted.

Figure 4:
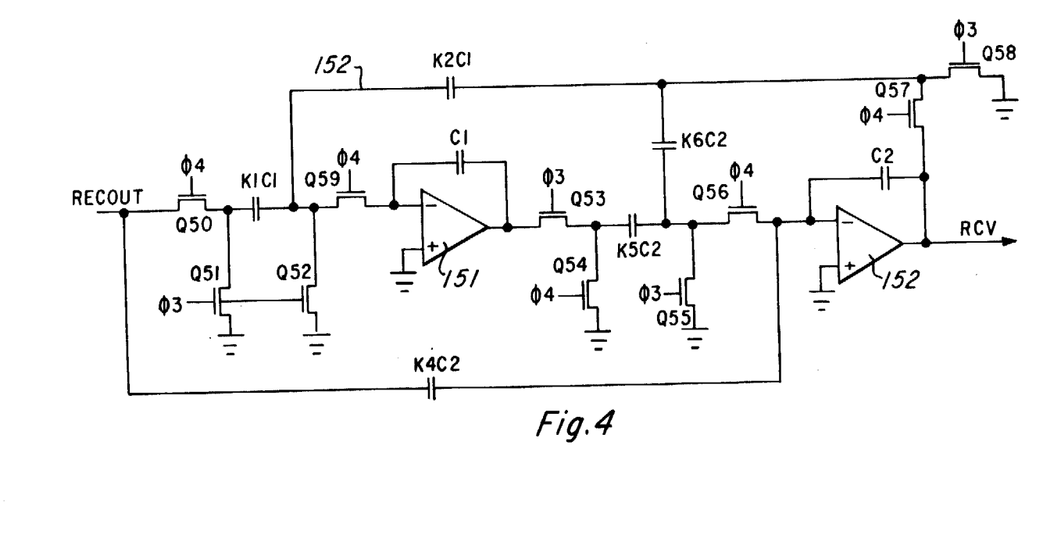
FIG. 4 is a schematic diagram of the output filter section of this demodulator.

As shown in FIG. 4, filter section 324 receives input signal RECOUT through the first main electrode of transistor Q50, gated by sample clock phase 4 to a second main electrode. Sample clock phases 3 and 4 are from the eight timing signals mentioned earlier.

Capacitor K1C1 is connected in series with the second main electrode of transistor Q50 and also in series with the first main electrode of transistor Q59 which is gated by phase 4, having a second main electrode connected to the inverting terminal of operational amplifier 151. Transistor Q51, gated by phase 3, is connected from the second terminal of transistor Q50 to ground. Transistor Q52, gated by phase 3, is connected from the first main electrode of transistor Q59 to ground. The non-inverting terminal of operational amplifier 151 is grounded and the output of operational amplifier 151 is fed back via capacitor C1 to its negative input terminal. This structure, so far described, is representative of the typical switched capacitor function.

The output of operational amplifier 151 is applied to one main electrode of transistor Q53, which is gated by phase 3, to a second main electrode. Capacitor K5C2 is connected in series with the second main electrode of transistor Q53 and to a first main electrode of transistor Q56, which is gated by phase 4. The second main electrode of transistor Q56 is connected to the inverting input of operational amplifier 152 and is also connected, by way of capacitor K4C2 to the first main electrode of transistor Q50. Transistor Q54, gated by phase 4, is connected from the second main electrode of transistor Q53 to ground. Transistor Q55, gated by phase 3, is connected from the first main electrode of transistor Q56 to ground. The non-inverting terminal of operational amplifier 152 is grounded and its output is fed back via capacitor C2 to its inverting input. The output of operational amplifier 152 is also connected through the first main electrode of transistor Q57, which is gated by phase 4, to its second main electrode which is connected to one terminal of capacitor K2C1 and one terminal of capacitor K6C2. The other terminal of capacitor K2C1 is connected to the first main electrode of transistor Q59, and the other terminal of capacitor K6C2 is connected to the first main electrode of transistor Q56. Transistor Q58, gated by phase 3, is connected from the second main electrode of transistor Q57 to ground.

FIG. 3A illustrates the space filter portion of the demodulator 18 of FIG. 1. That is, the signal AGC OUT is presented to the space filter and to a similar mark filter. FIG. 3A illustrates a switched capacitor filter whose output signal is applied as the space input to the full wave rectifier shown in FIG. 3B. The purpose of this full wave rectifier is to compare the energy supplied by the space filter with that supplied by the mark filter (both shown as inputs). The comparison is not done directly but a summing is ultimately performed.

Waveforms A illustrate clock phases 3 and 4, at a frequency of 25.846 KHZ with a duty cycle of 25% and a phase relationship as shown.

Waveform B of FIG. 5 illustrates the AGC OUT signal (as well as the FSK transmitted signal). Waveform C of FIG. 5 illustrates the output of the space filter and waveform D of FIG. 5 illustrates the output of the mark filter. That is, at the space frequency, much more energy is delivered by the space filter than at the mark frequency. Conversely, much less energy is presented by the space filter at the mark frequency and much more by the mark filter. The space signal is negatively rectified and the mark signal is positively rectified. These signals are shown as signals E and F respectively of FIG. 5. They are then summed in operational amplifier 323, its output being smoothed by filter 324 with signal RCV representing a smoothed difference as shown in waveform G of FIG. 5. Comparator 325 and associated logic circuitry provides the RCVD signal, which is the actual data received as shown in waveform H of Fig. 5.

This detailed description of the circuit and its operation illustrates a novel integrated circuit demodulator for FSK signals. It is contemplated that others may use analog filters of other designs, may use more than one integrated chip and vary widely in the values of components and in logic design without departing from the invention as described in the appended claims.

What is claimed is:

1. An integrated circuit demodulator for receiving an input alternating signal at a first frequency or a second frequency and providing a binary output corresponding to the first and second frequencies, comprising:
  (a) a first frequency filter for receiving the input alternating signal at the first or second frequencies, for attenuating the second frequency or passing the first frequency, the output of the first frequency filter being a first frequency signal;
  (b) a second frequency filter for receiving the input alternating signal at the first or second frequencies, for attenuating the first frequency or passing the second frequency, the output of the second frequency filter being a second frequency signal;
  (c) a positive full wave rectifier for receiving the first frequency signal and for providing a positive full wave rectification thereof comprising:
    (i) reference crossing detect means for detecting when the first frequency signal crosses a predetermined reference in a positive direction, and for providing a first output signal in response thereto;
    (ii) first output signal storing means, for storing the first output signal;
    (iii) first frequency signal storing means, for storing the first frequency signal; and
    (iv) inverting and non-inverting transfer circuitry, connected to the first output signal storing means, and to the first frequency signal storing means for inverting and transferring the contents of the first frequency signal storing means in the presence of the first output signal stored in the first output signal storing means, and for transferring, without inverting, the contents of the first frequency signal storing means in the absence of the first output signal stored in the first output signal storing means;
  (d) a negative full wave rectifier for receiving the second frequency signal and for providing a negative full wave rectification thereof; and
  (e) a summing operational amplifier for summing the positive and negative full wave rectifications to provide the binary output.

2. The circuit of claim 1 wherein the negative full wave rectifier comprises:
  (b)
    (i) reference crossing detect means for detecting when the second frequency signal crosses a predetermined reference in a negative direction, and for providing a second output signal in response thereto;
    (ii) second output signal storing means for storing the second output signal;
    (iii) second frequency storing means for storing the second frequency signal; and
    (iv) inverting and non-inverting transfer circuitry, connected to the second output signal storing means, to the second frequency signal storing means and to the summing operational amplifier, for inverting and transferring the contents of the second frequency signal storing means to the summing operational amplifier in the presence of the second output signal stored in the second output signal storing means, and for transferring, without inverting, the contents of the second frequency signal storing means to the summing operational amplifier in the absence of the second output signal stored in the second output signal storing means.

3. The circuit of claim 2 wherein the first and second output signal storing means and the first and second frequency signal storing means comprise capacitors.

4. The circuit of claim 1 further comprising a smoothing filter connected to the output of the summing operational amplifier.

5. The circuit of claim 2 wherein the integrated circuit comprises field effect transistors.

* * * * *